June 5, 1962 R. REEBER ET AL 3,037,471
MEANS FOR CONTROLLING THE STITCH WIDTH ON ZIG-ZAG SEWING MACHINES
Filed Nov. 23, 1959 5 Sheets-Sheet 1

INVENTORS
RUDOLF REEBER
AND HERBRT WENZ

BY Robert H. Jacob

AGT.

INVENTORS
RUDOLF REEBER
AND HERBERT WENZ

BY Robert H. Jacob

AGT.

INVENTORS
RUDOLF REEBER
AND HERBERT WENZ

BY Robert K. Jacob

AGT.

INVENTORS.
RUDOLF REEBER
AND HERBERT WENZ

BY Robert K. Jacob

AGT.

United States Patent Office 3,037,471
Patented June 5, 1962

3,037,471
MEANS FOR CONTROLLING THE STITCH WIDTH
ON ZIG-ZAG SEWING MACHINES
Rudolf Reeber and Herbert Wenz, Kaiserslautern, Germany, assignors to G. M. Pfaff AG, Kaiserslautern, Germany
Filed Nov. 23, 1959, Ser. No. 854,626
Claims priority, application Germany Nov. 24, 1958
5 Claims. (Cl. 112—158)

The present invention relates to sewing machines. More in particular the invention is concerned with an arrangement for controlling stitch widths on zig-zag sewing machines, which is essential for the sewing of button holes and which provides for controlled common setting of the upper and lower limit of the overstitch width.

Arrangements of this type are known where a simultaneous change of the upper and lower limit of the stitch width is possible while maintaining a fixed relative relationship of the magnitude and independently of predetermined shifting distances. The setting of this limit in that case is effected by means of an abutment carrier which can be cut in or out, and which by changing its position in relation to an abutment element connected with the shifting gear for the overstitch width, limits the abutment spaces of the element in two directions. In that arrangement the operating lever for the mechanism, the setting handle for the overstitch and the adjusting for the abutment limitation are arranged separately from one another in the machine arm.

Another known arrangement, while connecting the entire switching mechanism with a single setting handle, makes it necessary as is the case also in the first mentioned arrangement, to adjust the overstitch limit first, before the setting handle for the overstitch can be brought to the limitation of its turning movement which is changed by it.

It is an object of the present invention to improve arrangements of this type in a manner that all adjusting members are fixedly journalled in a fixed location, while also the entire mechanism is simplified in its construction and in its manipulation, and is at the same time constructed in a manner to save space. In accordance with the invention this is achieved in the first place in that two peripheral cam disks are provided between two rigidly connected follower arms of a movement receiving follower, the position of rotation of which controls the overstitch width and the range of movement of which is to be limited.

It has proven to be advantageous to arrange the said cam disks on a common setting shaft, where the effective curve portion extends perpendicularly to the said shaft.

In order to make it possible with such a mechanism to sew also straight stitches while maintaining the setting of the limitations, it is another object of the invention to construct the mechanism in a particularly simple manner, so that the setting member of the sewing machine which determines the overstitch is compelled to follow the receiving follower and extends into the path of movement of a special shifting member which suitably is journalled coaxially with the setting shaft, so that when said member is operated the shifting member can be separated from the receiving follower and returned to that position which corresponds to the straight stitch.

It is possible by means of the latter arrangement to provide a particularly accessible assembly of the operating handles and thus further facilitated operation, in that the shifting member carries a cam portion on the side remote from the setting member, into the path of movement of which projects an extension of that follower arm of the receiving follower which follows one of the cam disks.

Alone the arrangement of the manipulating members facilitates the organizing of their operation in that only one member, in a group of manipulating members which are concentrically journalled with respect to one another, serves for the setting of the overstitch width and another member for the temporary deviation from the adjusted width upwardly and downwardly, while the limitation for the deviation upwardly is provided simultaneously by the setting of the member which adjusts the overstitch width.

Further objects of the invention and details as to the advantages and improvements obtained therewith will become apparent from the following description of the embodiment illustrated in the accompanying drawings, in which—

Figure 14:
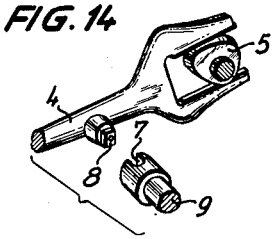
Figure 9:
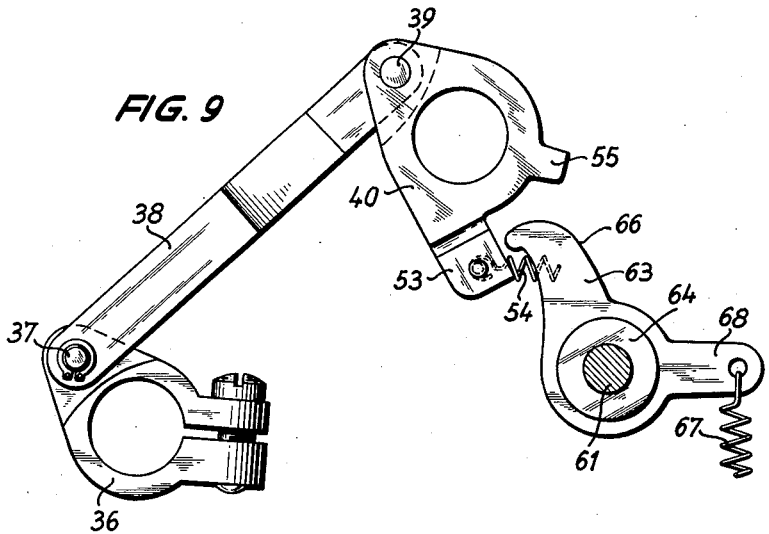
Figure 7:
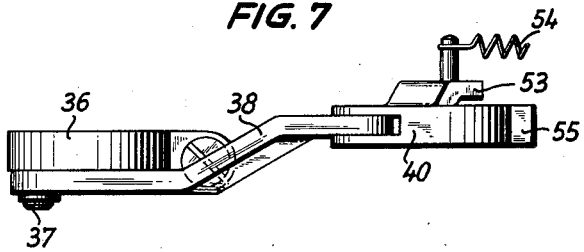
Figure 2:
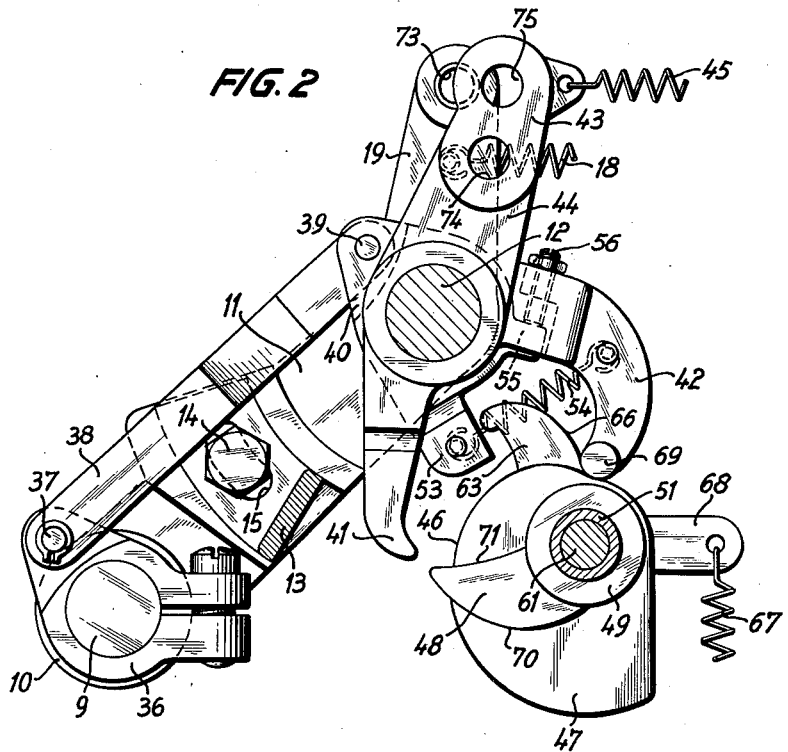
FIG. 2 is a front view of the mechanism partly in section.
Figure 11:
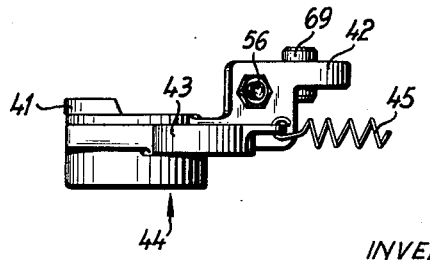
Figure 10:
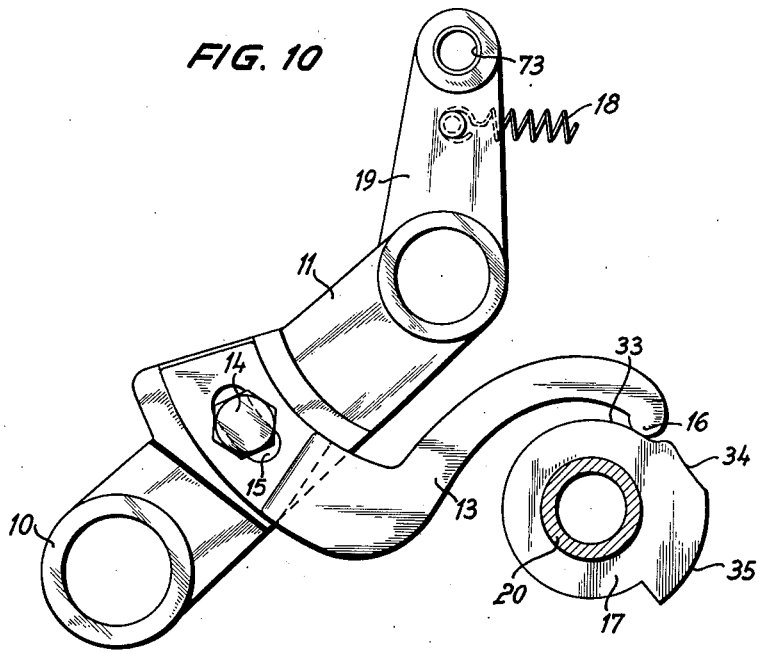
Figure 8:
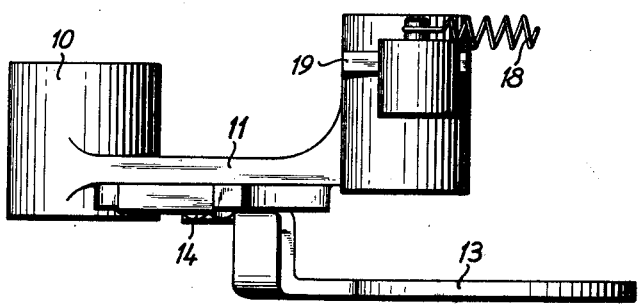
Figure 12:
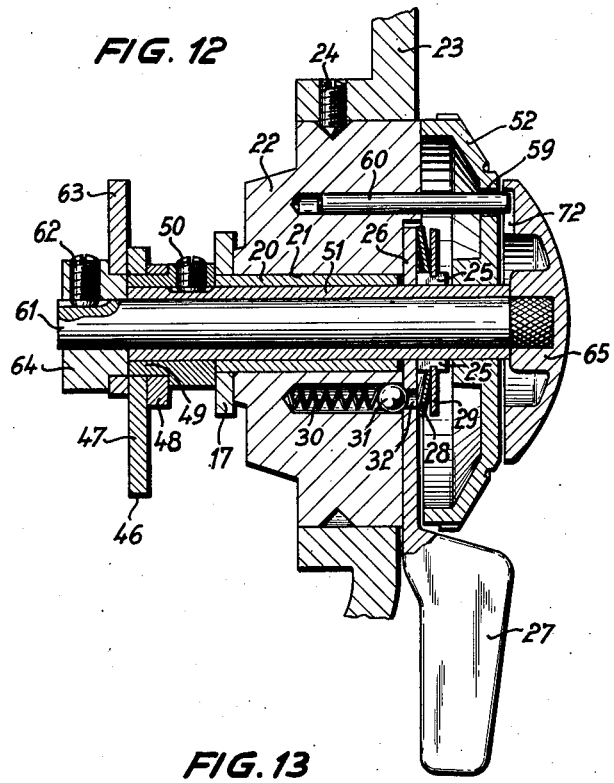
Figure 13:
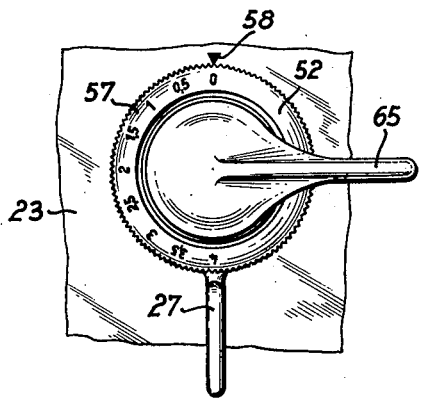

FIGS. 7 and 8 are top views of different parts of the mechanism shown in FIG. 2, FIGS. 9 and 10 are the corresponding front views of the parts illustrated in FIGS. 7 and 8, together with the cam disks which act upon them, FIG. 11 is a plan view of a further member of the mechanism illustrated in FIG. 2, FIG. 12 is an axial sectional view through the operating members and the cams associated therewith, FIG. 13 is a front view of the operating members, and FIG. 14 illustrates the guiding slot arrangement of the machine which is operated by the mechanism.

Figure 1:
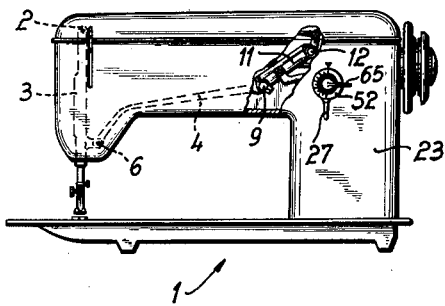
FIG. 1 is a front view of a machine incorporating the new mechanism.

The sewing machine 1 illustrated in FIG. 1 is provided in a known manner with a needle bar oscillator 3 suspended at a pivot 2, the lateral deflections of which are effected by a forked lever or link bar 4 which is driven in a known manner by a triangular cam 5 (FIG. 14) operatively connected to the arm shaft of the machine and which causes the forked lever or link bar 4 to move relative to the pivot joint 6 by which it is linked to the needle bar oscillator. The extent of the lateral deflections of the needle bar oscillator 3 as well as its initial position, i.e. the magnitude of the overstitch and the stitch location is determined by a slotted guide member 7 in which a block 8 is slidably received which in turn is rotatably mounted on the forked lever 4. The angular position of the guide member 7 determines the magnitude of the overstitch, while the lateral position of the guide shaft 9 (FIGS. 1, 2, 14) which supports the guide member 7 determines the stitch location.

The changes in position of the guide member 7 which are necessary to effect the changes in the overstitch and the stitch location, i.e. of the shaft 9 carrying the slotted member 7 can be made as described hereinafter.

The guide shaft 9 is rotatably journalled in an annular bearing 10 of the carrier arm 11 (FIGS. 1, 2, 8 and 10)

which in turn is pivotally supported in the machine housing on a pivot shaft 12. A follower arm 13 (FIG. 10) is adjustably mounted on carrier arm 11 by means of an adjusting screw 14 and a slot 15, and presents a follower end 16 which operatively engages the contours of a cam disk 17 (FIGS. 10 and 12) against which it is biased in any desired manner, as, for example, by a tension spring 18 (FIGS. 2 and 10) secured at one end to the machine housing, and at the other end to a lever arm 19 forming a unitary element with the carrier arm 11.

The cam disk 17 is mounted on a hollow shaft 20 which is rotatably journalled in a bore 21 (FIG. 12) of an insert 22, which, in turn, is secured in the front wall 23 of the machine housing by means of a set screw 24. The hollow shaft 20 is provided with recesses 25 on the side remote from the cam disk 17 which receive a disk 26 which thus is firmly connected with the hollow shaft 20 and the cam disk 17. A handle 27 is formed radially of the disk 26 by means of which the cam disk 17 can be rotatably adjusted.

Furthermore, a spring disk 28 which is biased against a lock ring 29 on hollow shaft 20, presses the disk 26 against the insert. A spring 30 biases a ball 31 in the insert 22, which cooperates with three catch bores 32 (only one of which is seen in FIG. 12) in a manner that the disk can be locked in three positions in each of which one of three cam sections 33, 34, 35 on disk 17 can be engaged by the end 16 of the follower arm 13.

The three cam sections 33, 34, 35 impart three different angular positions to the carrier arm 11 on its shaft 12 and consequently different lateral positions to the shaft 9 and the guide member 7. These lateral positions correspond to the stitch locations left, center and right for the lateral displacement of the needle bar oscillator 3. The desired stitch location can be obtained with the arrangement described by operating the handle 27.

A clamping member 36 is mounted on the shaft 9 which carries the guide member 7 (FIG. 9), and a link 38 is pivotally connected at one end to member 36 by means of a bolt 37 and at the other end by means of a bolt 39 to a setting member 40 which is rotatably mounted on the shaft 12. The connection of the clamping member 36 with the setting member 40 by way of link 38 insures that the clamping member 36 always assumes the same angular position relative to the machine housing as the setting member 40 on the stationary shaft 12, in spite of being carried by the movable arm 11. Consequently, the angular position of the setting member 40 determines the angular position of guide shaft 9 and thus of the slotted guide member 7 and accordingly also of the magnitude of the overstitch, independently of the stitch location set up as a result of the position of the carrier arm 11. In this connection the position of the setting member 40 shown in FIG. 2 corresponds to the zero position for the overstitch width, while rotation from this position in a counterclockwise direction increases the stitch width.

Figure 3:
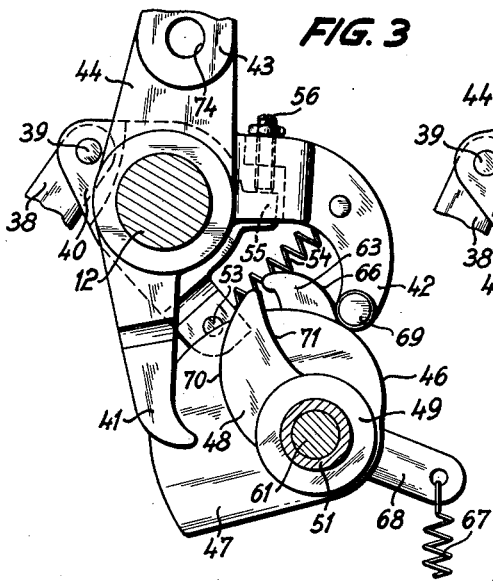
FIGS. 3 to 6 illustrate different setting conditions.
Figure 4:
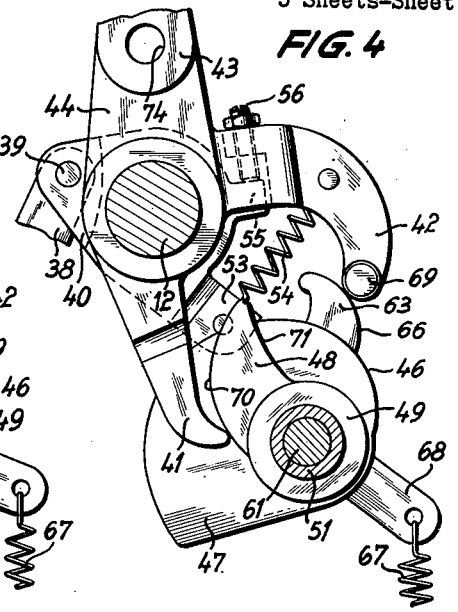
Figure 5:
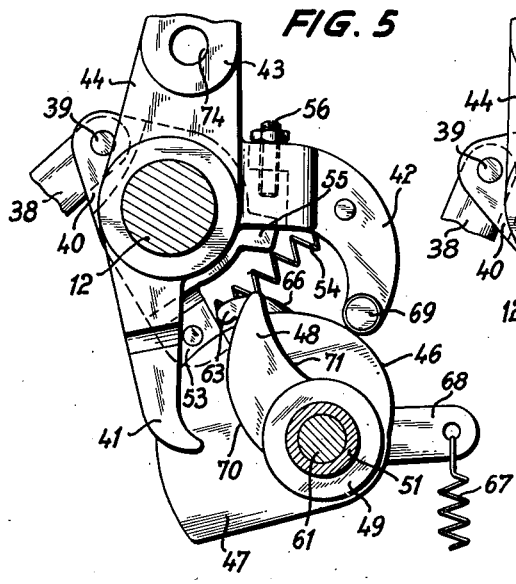

A receiving follower member 44 having a pair of follower arms 41 and 42 (FIGS. 2-6 and 11) as well as a lever arm 43 are likewise rotatably mounted on shaft 12. This receiving follower member 44 is biased by a tension spring 45 (FIGS. 2 and 11) fastened to the machine housing in any desired manner, which is connected to the lever arm 43, in a manner that normally its follower arm 42 operatively engages a peripheral curve 46 of a cam disk 47 (FIGS. 2, 3 and 5).

The cam disk 47 is mounted in the plane of the follower arm 41 together with a cam disk 48 upon a sleeve 49, which is secured by means of a set screw 50 (FIG. 12) upon a hollow control shaft 51 rotatably supported in the hollow shaft 20. The control shaft 51 which is provided at its forward end with a rotating knob 52 serves as a common setting shaft for the two cam disks 47 and 48.

A tension spring 54 arranged between an arm 53 (FIG. 2) of the setting member 40 and the follower arm 42 of the follower member 44 provides by virtue of abutment means for engagement of the setting member 40 by way of an offset 55 with an adjusting screw 56 with the receiving follower 44. The abutment means include the offset 55 on member 40 and an adjusting screw 56 on arm 42. The setting member 40, which as explained above determines the overstitch of the machine, consequently follows the receiving follower 44 (FIGS. 2, 3, 4 and 6) in a manner that the latter influences the overstitch of the machine as long as a force transferring engagement exists.

The cam disk 46 which guides the receiving follower 44 by way of follower arm 42 is shaped in a manner that by way of the driving connection with the slotted member 7, it obtains an overstitch which corresponds to that indicated upon a scale 57 (FIG. 13) of the rotating knob 52 with respect to a notch 58 on the front wall 23 of the machine housing. The movement of the rotating knob 52 to the extent necessary is limited by an arcuate slot 59 (FIG. 12) in the rotatable knob 52 and a pin 60 secured to its insert 22.

A shifting shaft 61 is rotatably journalled in hollow control shaft 51, upon which shaft 61 an annular member 64 supporting a shifting member 63 is secured by means of a set screw 62. The shifting member 63 in this manner follows the rotations of shaft 61 which can be operated by means of a knob 65 provided at its forward end. The shifting member 63 is provided with a cam portion 66 which, by virtue of the force of a spring 67 secured to the machine housing in any desired manner and which is fastened to a lever arm 68 of the shifting member 63, engages a projection 69 (FIGS. 2 and 11) of the follower arm 42. However, the spring 67 is not able to overcome the force of the spring 45 which acts upon the receiving follower 44, so that the position of the receiving follower 44 normally depends only from the position of cam 46; the spring 67 merely serves for eliminating play. However, if the shaft 61 is rotated clockwise together with the shifting member 63 as in FIGS. 2-6, the follower arm 42 is raised from the cam 46 against the force of the spring 45 (FIG. 4), whereby the follower arm 41 which is fixed with respect to follower arm 42 approaches cam disk 48 until it engages the other cam 70. In the embodiment of the invention illustrated, this cam is shaped in such a manner that as the follower arm 41 engages the cam 70, the receiving follower 44 and consequently the setting member 40 which determines the overstitch produces the double value of that overstitch which results from the same setting of the hollow control shaft 51 when the follower arm 42 engages the cam 46. The overstitch magnitudes for corresponding points of the cams 46 and 70 consequently are at a ratio of 1:2, which furthermore causes that only in the range of the cam 46 which corresponds to overstitch magnitudes smaller or equal to one-half the maximum overstitch of the machine (in the example illustrated <2), the cam 70 provides a limit for the follower arm 41.

Figure 6:
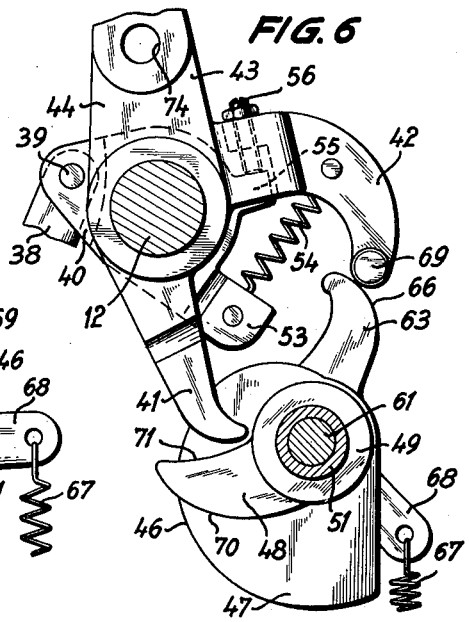

The cam disk 48 (FIG. 2) has a steeply descending portion 71 in a manner that in the position of the hollow shaft 51 which corresponds to overstitch setting "Zero," the receiving follower 44 has its full range of operation between the maximum overstitch and the position corresponding to the overstitch "Zero." Thus by setting the overstitch "Zero" on the scale 57 by operating the knob 65 and accordingly the shifting member 63 in a clockwise direction, the overstitch can be changed against the force of spring 45 through its entire range of variation as shown in FIG. 6.

On the other hand, the arm 53 of the setting member 40 extends also into the range of operation of the shifting member 63. By operating the latter counterclockwise, it is also possible to remove the operative engagement of the setting member 40 with the receiving follower 44 effected by the spring 54, the abutment 55 and the adjusting screw 56 (FIG. 5) and to return the setting member 40 to its position corresponding to overstitch "Zero." The limitation of the path of movement necessary for the shifting member 63 is constituted by the pin 69 (FIG. 12) with a limited recess 72 in operating knob 65.

The arrangement illustrated and described has the advantage of a very plainly surveyable assembly of the operating knobs (see FIG. 13). The rotatable knob 52 serves for the setting of the overstitch, the handle 27 for the setting of the stitch location. The knob 65 permits the deviation from the overstitch set by the knob 52, more in particular when it is rotated in a counterclockwise direction towards smaller overstitches to the limit "Zero," when it is rotated in clockwise direction towards larger stitches having a limit of magnitude which has already been predetermined by the setting of the knob 52, and in the embodiment illustrated in a certain range twice that of the overstitch determined by the knob 52.

The lever arms 19 and 43 are provided with engagement conformations 73, 74, 75 for an automatic control mechanism known per se. Before cutting in this mechanism it is merely necessary to set the knob 52 to "Zero" and the handle 27 to its extreme left position, whereupon the impulses transmitted to the lever arms 19 and 43 by the automatic control mechanism can effect the changes of the stitch location and overstitch width.

Having now described our invention with reference to the embodiment illustrated, we do not wish to be limited thereto, but what we desire to protect by Letters Patent of the United States is set forth in the appended claims.

We claim:

1. In a zig-zag sewing machine having a housing, a needle bar oscillator and a drive shaft supported by said housing, needle bar actuating means connected to said drive shaft, a link bar extending between said needle bar oscillator and said actuating means, and guide means adapted to control the position and movements of said link bar including a guided block connected to said link bar and a guide shaft having an end in engagement with said block, manual control means operative to adjust said guide means for different stitch widths and to positively set conjointly therewith the upper and lower limits of the stitch widths, said control means including a stationary pivot shaft mounted in said housing, a control shaft extending through said housing and parallel to said pivot shaft, a pair of cam disks mounted on said control shaft in said housing in axially spaced relationship and extending radially of said control shaft, a follower member mounted on said pivot shaft having a pair of cam follower arms rigidly connected thereto and extending outwardly from said pivot shaft, each into the path of movement of one of said cam disks, a carrier arm pivotally supporting said guide shaft at one end and supported at the other end on said pivot shaft, a setting member pivotally mounted on said pivot shaft in operative relationship to said follower member, a clamping member on said guide shaft, a link pivotally connected at one end to said clamping member and at the other end to said setting member and a major biasing spring connected to said follower member operative to bias one of said follower arms into engagement with one of said cam disks.

2. In a zig-zag sewing machine having a housing, a needle bar oscillator and a drive shaft supported by said housing, needle bar actuating means connected to said drive shaft, a link bar extending between said needle bar oscillator and said actuating means, and guide means adapted to control the position and movements of said link bar including a guided block connected to said link bar and a guide shaft having an end in engagement with said block, manual control means operative to adjust said guide means for different stitch widths and to positively set conjointly therewith the upper and lower limits of the stitch widths, said control means including a stationary pivot shaft mounted in said housing, a control shaft extending through said housing and parallel to said pivot shaft, a pair of cam disks mounted on said control shaft in said housing in axially spaced relationship and extending radially of said control shaft, a follower member mounted on said pivot shaft having a pair of cam follower arms rigidly connected thereto and extending outwardly from said pivot shaft, each into the path of movement of one of said cam disks, a carrier arm pivotally supporting said guide shaft at one end and supported at the other end on said pivot shaft, a setting member pivotally mounted on said pivot shaft in operative relationship to said follower member, a clamping member on said guide shaft, a link pivotally connected at one end to said clamping member and at the other end to said setting member, a major biasing spring connected to said follower member operative to bias one of said follower arms into engagement with one of said cam disks, said follower member and said setting member including abutment means therebetween, and a connecting spring being connected to said follower member and to said setting member maintaining said abutment means in engagement to maintain the adjusted relationship between said follower member and said setting member during movement of said control shaft, said connecting spring being weaker than said biasing spring.

3. In a zig-zag sewing machine having a housing, a needle bar oscillator and a drive shaft supported by said housing, needle bar actuating means connected to said drive shaft, a link bar extending between said needle bar oscillator and said actuating means, and guide means adapted to control the position and movements of said link bar including a guided block connected to said link bar and a guide shaft having an end in engagement with said block, manual control means operative to adjust said guide means for different stitch widths and to positively set conjointly therewith the upper and lower limits of the stitch widths, said control means including a stationary pivot shaft mounted in said housing, a control shaft extending through said housing and parallel to said pivot shaft, a pair of cam disks mounted on said control shaft in said housing in axially spaced relationship and extending radially of said control shaft, a follower member mounted on said pivot shaft having a pair of cam follower arms rigidly connected thereto and extending outwardly from said pivot shaft, each into the path of movement of one of said cam disks, a carrier arm pivotally supporting said guide shaft at one end and supported at the other end on said pivot shaft, a setting member pivotally mounted on said pivot shaft in operative relationship to said follower member, a clamping member on said guide shaft, a link pivotally connected at one end to said clamping member and at the other end to said setting member, a major biasing spring connected to said follower member operative to bias one of said follower arms into engagement with one of said cam disks, said follower member and said setting member including abutment means therebetween, a connecting spring being connected to one arm of said follower member and to said setting member maintaining said abutment means in engagement to maintain the adjusted relationship between said follower member and said setting member during movement of said control shaft, said connecting spring being weaker than said biasing spring, and means adapted to adjust the control means for straight stitching while maintaining the stitch limits to which said control means is set, comprising shifting means including a shifting shaft mounted coaxially with said control shaft and supporting a shifting member, said one arm having a member at the end thereof for engagement by said shifting member to move said follower arm and thereby said setting member until said follower arm engages the cam associated therewith, thereby establishing twice the stitch width for which said control shaft has been set.

4. The control means in accordance with claim 3, said means comprising a hollow shaft concentric with said control shaft having a manipulating lever externally of said housing and supporting a setting cam inside said housing for setting the position of said needle bar oscillator, a follower arm connected at one end to said carrier arm and having operative engagement with said setting cam at the other end, and a pair of control knobs disposed outside said housing one connected to said control shaft and the other connected to said shifting shaft.

5. The control means in accordance with claim 3 wherein said setting member has an arm extending into the path of movement of said shifting member to rotate said setting member and disengage said abutment means.

References Cited in the file of this patent

UNITED STATES PATENTS

| | | |
|---|---|---|
| 2,713,838 | Johnson et al. | July 26, 1955 |
| 2,810,360 | Perla | Oct. 22, 1957 |
| 2,862,468 | Johnson | Dec. 2, 1958 |
| 2,863,409 | Schumann et al. | Dec. 9, 1958 |
| 2,906,219 | Vigorelli | Sept. 29, 1959 |
| 2,966,868 | Theenhausen et al. | Jan. 3, 1961 |

FOREIGN PATENTS

| | | |
|---|---|---|
| 564,305 | Italy | June 14, 1957 |
| 781,221 | Great Britain | Aug. 14, 1957 |